United States Patent
Edwards

[15] 3,699,387
[45] Oct. 17, 1972

[54] IONIC WIND MACHINE
[72] Inventor: Harrison F. Edwards, 79 S. Broad Street, Norwich, N.Y. 13815
[22] Filed: June 25, 1970
[21] Appl. No.: 49,714

[52] U.S. Cl. .........................317/4, 310/5, 315/111, 317/262 R
[51] Int. Cl. ..............................................H05h 5/06
[58] Field of Search ............317/4; 55/109, 116, 121; 204/313, 315; 417/48, 49; 315/111; 313/63, 231; 310/10, 11, 5

[56] References Cited

UNITED STATES PATENTS 3,361,337  1/1968  Hurst.........................315/111
3,120,363  2/1964  Hagen........................310/5 X
2,343,338  3/1944  Steel..........................317/4 X Primary Examiner—J. D. Miller
Assistant Examiner—Harry E. Moose, Jr.
Attorney—Le Blanc & Shur

[57] ABSTRACT

Disclosed is a wind generating machine with no moving parts. A thin corona wire is located adjacent a wire mesh and a potential gradient of from 7,000 to 20,000 volts causes air to flow in a direction from the wire toward the mesh. The air flow is voltage sensitive. Several stages may be provided and the mesh may form part of a continuous belt. A rigid self-contained assembly is provided by physically connecting the wire and mesh.

3 Claims, 10 Drawing Figures

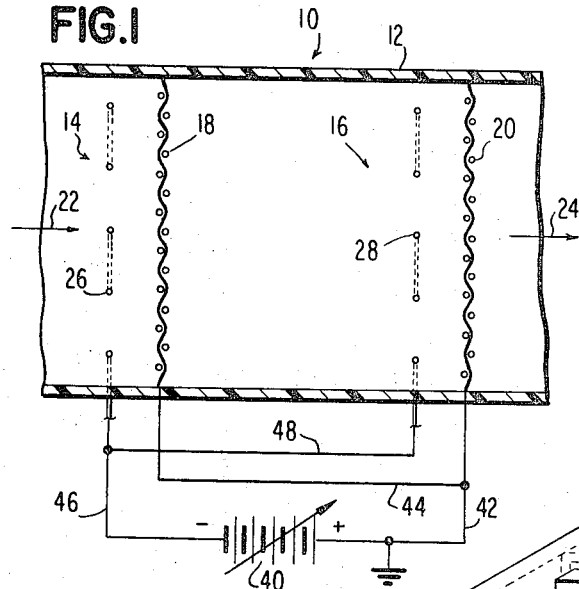
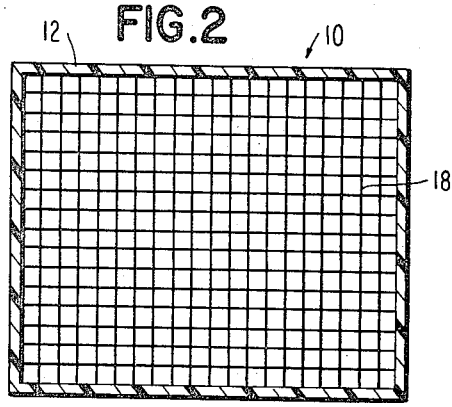
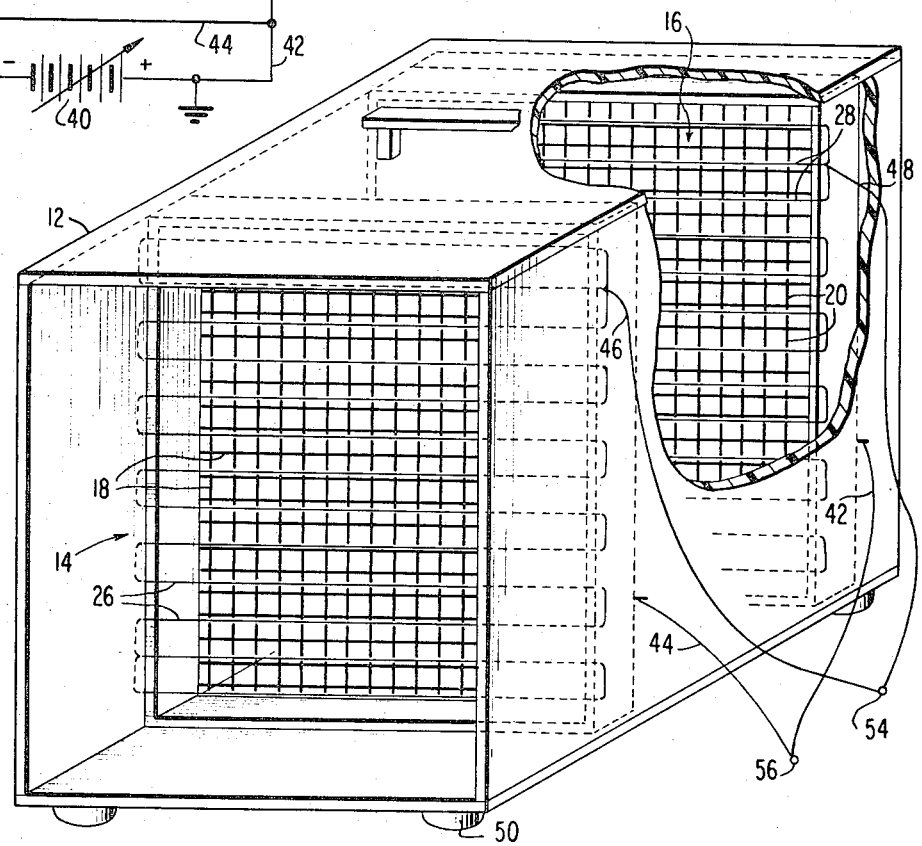
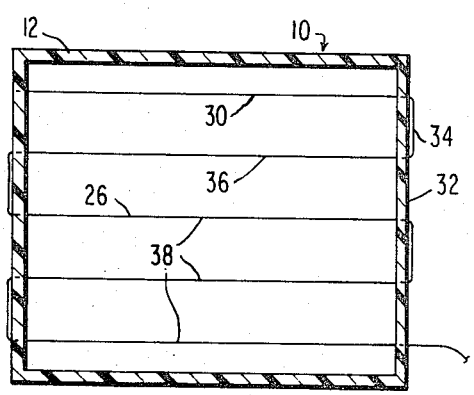
INVENTOR
HARRISON F. EDWARDS
BY  *LeBlanc & Shur*
ATTORNEYS

IONIC WIND MACHINE

This invention relates to an electrical device for moving air and other fluids having no moving parts and more particularly to a machine in which air flow is generated due to the interaction of ions with an electrostatic field. While particularly constructed to optimize air flow, the device of the present invention also acts as an electrostatic precipitator for filtering smoke, dust particles, and the like from the air.

Ionic wind generation machines have been known for some time and generally include one or more point sources having a high electrical potential of one polarity spaced from an ion collector of opposite polarity. The electrostatic field between the point source and the collector produces a flow of air between the electrodes in association with a corona-type discharge, sometimes referred to as an "electric wind."

The exact mechanism of air acceleration producing the air flow is not fully understood but is believed due to the production of ions which are accelerated away from the point source towards the collector plate of opposite polarity. It is believed that ions are generated by the corona discharge and that some of these ions in accelerating towards the collector plate strike molecules to produce secondary ions, resulting in a cumulative effect whereby air flow is generated in the electrostatic field existing in the region between the oppositely charged electrodes. The magnitude and direction of air flow is independent of electrode polarity and in all instances flows from the point source toward the collector plate.

In previous constructions, the collector plates have taken a variety of shapes but the corona electrode has either been a single rod or a few wires spaced in one or two small concentric circles to simulate a plurality of point sources. The multiple point source electrodes have an appearance somewhat resembling a brush and are sometimes referred to as brush electrodes. The necessity for simulating point sources has placed severe limitations on the efficiency and economic practicability of previous electrical wind generators in that the so-called brush electrodes are difficult and expensive to fabricate and the relatively few point sources located near the central path of the air flow necessarily limited the quantities of air which could be efficiently propelled by the machines. In addition, the point sources or brush electrodes do not represent an optimum construction for obtaining electrostatic precipitation so that the filtering action of previous constructions has been extremely limited.

The present invention is based on the discovery that the so-called "electric wind" can be generated using corona electrodes of completely different construction and ones which do not resemble the point sources of previous constructions. In particular, it has been found that the corona discharge is generated as a surrounding sheath along the length of an extremely fine wire when this wire is placed in the vicinity of an oppositely charged electrode or wire mesh forming a ground plane substantially parallel to the plane of the fine corona wire. With this construction, the air flow is substantially independent of air conduit cross section so that vast quantities of air can be moved at a minimum of expense. That is, the quantity of air movable with the device of this invention is directly proportional to the area of the wire mesh forming the collector plate and to the area spanned by the thin corona wire, both of which can be economically made extremely great. The elongated corona wire and wire mesh or screen construction provides increased precipitating action and collection of foreign matter on the collector screen so that enhanced filtering action is possible. This construction and its resemblance to more or less conventional precipitator designs renders the ionic wind machine of the present invention particularly adapted for use as a wind generating electrical precipitator, either by itself or in conjunction with additional precipitator electrodes. Since the velocity or rate of air flow is within wide limits, almost directly proportional to the applied voltage, the amount of the air flow is readily controlled through the use of a conventional Variac or other variable impedance element electrically connected to the power supply.

In the present invention, a relatively thin wire having a diameter no greater than about 0.020 inch is preferably suspended in zig-zag fashion throughout the cross section of an air duct so that the successive strands of the corona wire all lie in substantially a single plane transverse to the flow of air through the duct. A collector plate, preferably in the form of a conductive wire mesh, is spaced about an inch from the corona wire and extends completely across the duct in a plane parallel to the plane of the corona wire strands. When one of these electrodes is connected to a potential source, in the neighborhood of about 7,000 to 20,000 volts, air flow is induced in the region between the electrodes along the longitudinal axis of the duct and in a direction extending from the fine corona wire toward the wire mesh. In the preferred embodiment, the wire mesh or collector electrode is grounded and the corona wire is electrically connected to the active side of the power supply, either + or −, to product the electronic wind. Ions are accelerated in the electrostatic field and ionized particles of smoke, dust, dirt, and other materials in the air are collected on the wire mesh by the so-called Cotrell effect forming the basis for many electrostatic precipitators. Since the "electric wind" is independent of polarity, the electrodes may be connected to A.C. source and wind generated even at frequencies up to and including R.F. frequencies.

It is therefore one object of the present invention to provide an improved wind generating device having no moving parts.

Another object of the present invention is to provide an ionic wind machine or wind generator having an improved corona electrode.

Another object of the present invention is to provide an ionic wind machine in which the corona electrode is in the form of a continuous and relatively fine wire.

Another object of the present invention is to provide an improved ionic wind generator having increased electrostatic precipitation action.

Another object of the present invention is to provide an ionic wind machine in which the flow rate is almost directly proportional to the applied voltage over a wide range of voltages.

Another object of the present invention is to provide an ionic wind machine in which the quantities of air which can be economically moved are almost unlimited and dependent solely on the area spanned by the wire electrodes.

Another object of the present invention is to provide an ionic wind generator particularly adapted for use with ionic precipitators.

These and further objects and advantages of the invention will be more apparent upon reference to the following specification, claims, and appended drawings, wherein:

FIG. 1 is a partially schematic diagram showing a two-stage wind machine constructed in accordance with the present invention;

FIG. 2 is a view taken at right angles to FIG. 1 showing the grounded electrode or wire mesh collector screen of the wind machine of FIG. 1;

FIG. 3 is a similar view taken at right angles to that of FIG. 1 showing the fine wire corona electrode in one of the stages of the wind machine of FIG. 1;

FIG. 4 is a perspective view of a wind machine of the type illustrated in FIG. 1 constructed in accordance with the present invention;

Figure 5:
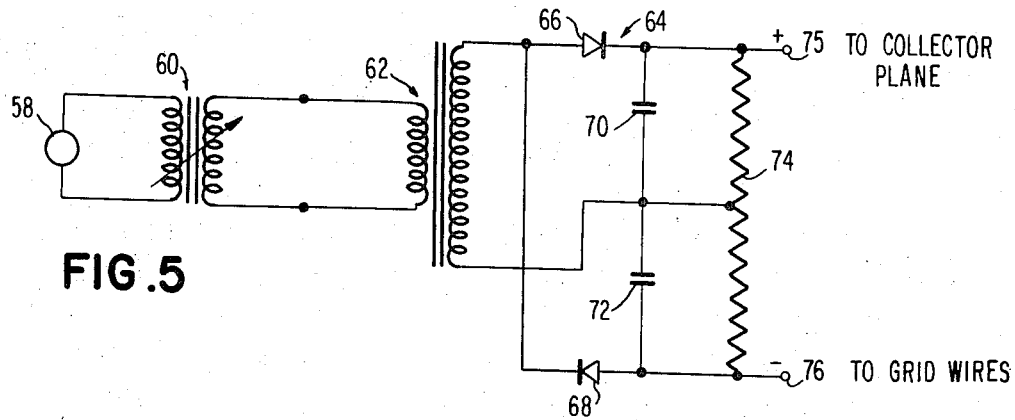
FIG. 5 is a circuit diagram of a D.C. power supply usable with the wind machine of FIG. 4.

Referring to the drawings, the novel wind machine of the present invention is generally indicated at 10 in FIG. 1 and comprises a duct 12 for air, exhaust gases, or any other dielectric fluid which may be propelled under the influence of an electrostatic field. In the preferred embodiment, duct 12 is of rectangular cross section and is formed of a suitable electrical insulating material, such as plexiglas or other plastic. The wind machine 10 in FIG. 1 is illustrated as having two separate spaced stages, generally indicated at 14 and 16, respectively, but it is understood that one or more stages may be employed as desired. The electric wind effect is cumulative in that two stages produce almost twice the wind as a single stage, three stages almost three times, and so on, except for friction and other loses in the system as the air flow is increased.

Extending transversely across the duct 12 are a pair of identical collector plates or collector screens 18 and 20, the former being illustrated in FIG. 2, which is a view taken at right angles to the view in FIG. 1. Screens 18 and 20 preferably take the form of a relatively open conductive wire mesh with openings sufficiently large such that the screen does not unduly impede the flow of air along the conduit in the direction of the arrows 22 and 24 in FIG. 1. Positioned upstream of collector meshes 18 and 20 are identical corona wires 26 and 28, the former being illustrated in FIG. 3 which is also a view taken at right angles to the view of FIG. 1 through conduit 12. Corona electrode 26 preferably takes the form of a single continuous wire which has a first or top strand 30 extending completely across conduit 12 and through a suitable aperture in the conduit where it is looped to overlie a portion of the sidewall 32 of the conduit as at 34 and passes back through a second aperture to form the next lower strand 36. Electrode 28 is similarly looped and zig-zagged back and forth to form the subsequent strands 38 such that the wire zig-zags back and forth over the entire cross sectional area of the conduit to form the parallel strands, all lying in a plane parallel to the plane of the wire mesh 18 and transverse to the flow axis of the air through conduit 12. A variable D.C. power supply 40 is illustrated in FIG. 1 as having its positive or grounded side connected by wires 42 and 44 to the conductive wire meshes or collectors 18 and 20. The negative side of the variable D.C. power supply 40 is connected by leads 46 and 48 to the two corona wires 26 and 28 of the two wind machine stages 14 and 16.

As the potential of source 40 is increased to about 7,000 volts, a flow of air is induced longitudinally of the conduit in the direction of the arrows 22 and 24 in FIG. 1. The rate of flow of the air through the conduit (neglecting loses) increases almost linearly with further increases in the voltage source 40 up to and including a voltage value of about 20,000 volts. In addition to the voltage sensitive propulsion of air, it has been found that substantial precipitation takes place with a substantial collection of smoke, dust, dirt, and other particles which may be carried by the air onto the collector electrodes or meshes 18 and 20. No significant change in flow is noted by disconnecting electrodes 18 and 20 from ground nor does a reversal of the polarity of source 40 have any significant affect on the direction of air flow or the quantity of air moved by the device for a given potential. That is, the polarity of pattery 40 may be reversed and the same wind generating effect is noted. By having the corona electrodes 26 and 28 connected to the negative side of the power supply, a slightly better precipitating action is obtained onto meshes 18 and 20.

FIG. 4 shows an embodiment of an actual wind machine constructed in accordance with the present invention and comprising rectangular cross section conduit 12 made of plexiglas and having an overall width of 10 inches, an overall height of 11 inches, and an overall length of 12 inches. The bottom of the conduit was provided with short legs 50 and connected to the top of the conduit is a handle 52 so that the machine can be carried about for the purposes of display. In the preferred construction for the embodiment of FIG. 4, the corona wires 26 and 28 were made of No. 31 gage magnetic copper wire having a diameter of 0.010 inch. The diameter of the wire forming the corona electrodes 26 and 28 has been found quite critical and the wind effect is substantially reduced when the wire diameter is increased above about 0.020 inch. For this reason, it is believed that a wire diameter of 0.020 inch or less is essential for obtaining the corona effect and the smaller the diameter of the corona wire, the better the wind generation. The only limit as to a reduction in wire size is the decreasing physical strength of the wire and its ability to support itself in spans across the duct so that wire having a diameter of 0.010 inch has been found very suitable. In the same embodiment, the two collector meshes 18 and 20 took the form of an open mesh of galvanized mild steel having rectangular openings between wire strands approximately one-fourth inch on each side. The diameter of the wire for the wire meshes 18 and 20 is not critical, the only requirement being that the mesh have sufficient conductive metal to form a good ground plane adjacent the corona wires, while at the same time having sufficient open space between strands so as to not unduly impede the flow of air along the conduit. In the embodiment of FIG. 4, the corona wire, such as the wires 26 and 28, are spaced apart approximately one inch from the corresponding meshes 18 and 20. The electric wind effect becomes noticeable when the electric field between the corona wires and the mesh exceeds about 7,000 volts per linear inch, so that with a one inch spacing the electric wind effect begins when the source potential reaches about 7,000 volts. The preferred spacing between successive parallel strands of the corona wires 26 and 28 is about 1-½ inches between the centerlines of adjacent strands. Again, this spacing is not critical and noticeable wind effects have been noted with strand spacings of as little as three-fourths inch.

In operating the device of FIG. 4 in a dark room, a sheath of corona discharge is noted along the length of the corona wires 26 and 28. This discharge appears to create a fan-shaped visible glow between the corona wire and the collector screen. The major included angle between the collector screen and the corona wire is approximately 30°. The glow is visible in subdued daylight and the color is primarily violet reaching into ultraviolet. With the power supply adjusted to give a potential of approximately 15,000 volts, the air flow through the machine 10 of FIG. 4 is at a rate of over 300 linear feet per minute. This rate is reduced almost to half by disconnecting one of the stages from the power supply.

FIG. 5 shows a D.C. power supply for the wind machine 10 of FIG. 4 connectable to the terminals 54 and 56 for the leads 48 and 46 to the corona wires and for the leads 42 and 44 of the collector meshes, respectively. A conventional 110 volt, 60 Hz source 58, such as a conventional power main outlet, supplies an A.C. signal to the primary of a variable transformer 60. The secondary of transformer 60, which may be in the form of a conventional Variac, is transformer coupled as at 62 to a rectifier-doubling circuit 64, including rectifier diodes 66 and 68, capacitors 70 and 72, and a variable tap bleed resistor 74. The positive side of the output at terminal 75 is connected to the collector plane terminal 56 of FIG. 4, whereas the negative side of the power supply output at terminal 76 is connected to the corona grid wire terminal 54 in FIG. 4. These terminals can be reversed if desired.

Figure 6:
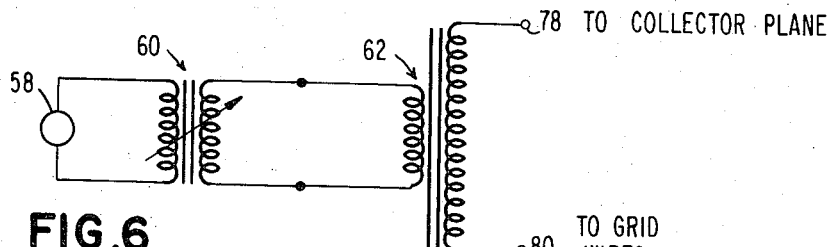
FIG. 6 is a circuit diagram of an A.C. power supply usable with the wind machine of FIG. 4.

FIG. 6 shows a circuit diagram for an A.C. power supply for the wind machine 10 of FIG. 4 with like parts bearing like reference numerals. Again, a conventional 110 volt, 60 Hz source 58 is connected through variable transformer 60 and stepup transformer 62 to a pair of output terminals 78 and 80 connected to the secondary of transformer 62. Terminal 78 is connected to terminal 54 in FIG. 4 and output terminal 80 of FIG. 6 is connected to terminal 56 in FIG. 4. Since the circuit of FIG. 6 produces an A.C. output, these connections can obviously be reversed if desired. It has been found that when operating from an A.C. power supply, the wind effect is reduced to about 70 percent of the wind generated by a D.C. supply of the same voltage. However, the A.C. supply is more economical, particularly when operated at higher frequencies up to and including R.F. frequencies. The direction of wind flow is the same for A.C. as it is for D.C. of either polarity.

Figure 7:
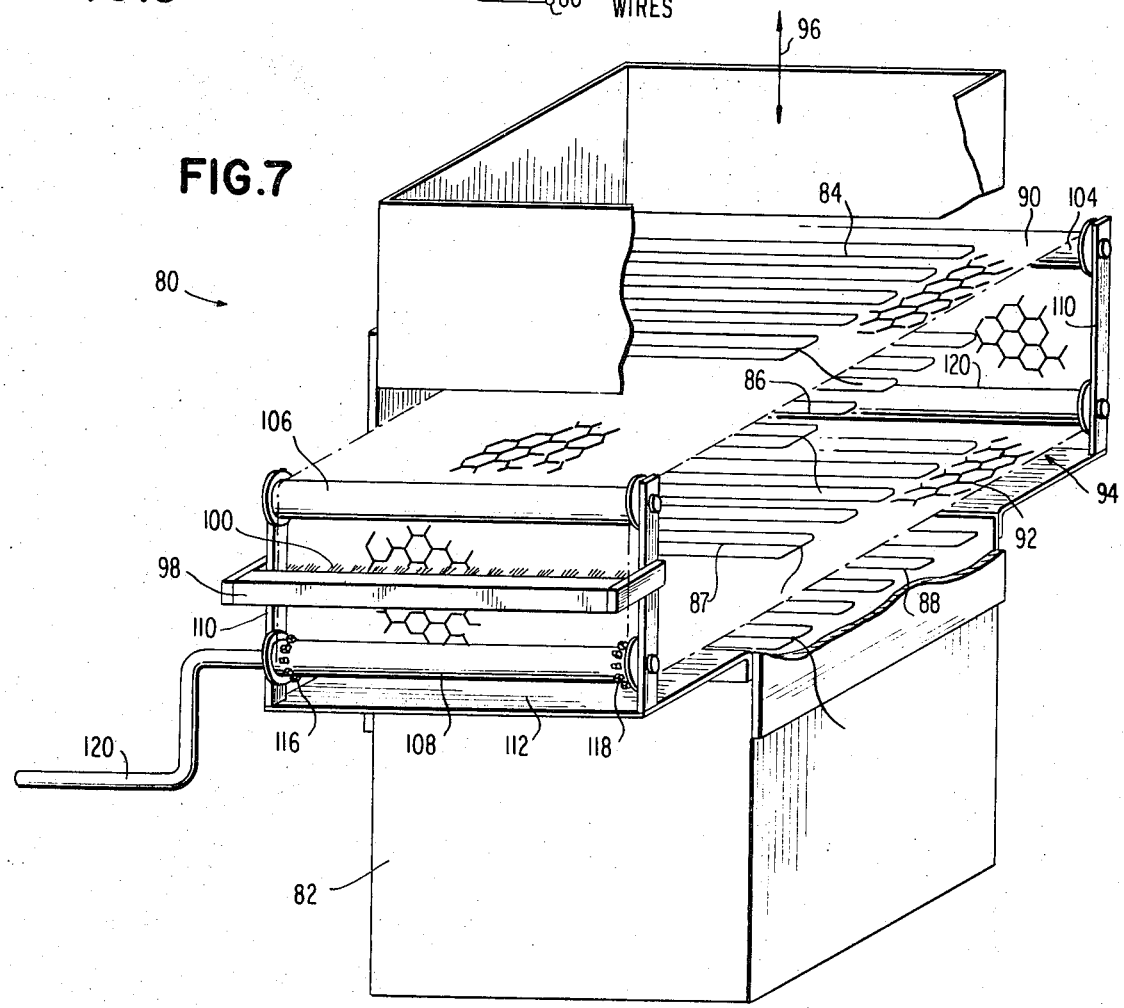
FIG. 7 shows a modified wind machine construction in which the collector electrodes take the form of a continuous belt of flexible mesh material.

FIG. 7 shows a modified wind machine constructed in accordance with the present invention and generally indicated at 80. The wind machine again comprises a rectangular duct 82 of suitable electrical insulating material, such as plastic or the like. Extending across the duct 82 at spaced locations in FIG. 7 are four corona wires 84, 86, 87, and 88, which are in all respects identical to the two corona wires 26 and 28 of FIGS. 1 and 4. Passing between corona wires 84 and 86 is a length of flexible metal belt or screen 90 and similarly passing between corona wires 87 and 88 is a second length 92 of flexible metal belt, generally indicated at 94. Belt 94 is both flexible and continuous and the lengths 90 and 92 form the collector electrodes for the corona wires 84, 86, 87, and 88. Four corona wires are illustrated in FIG. 7 so that air may be driven in either direction as indicated by the double ended arrow 96 in FIG. 7. It is understood that only two of the corona wires are energized at any one time, namely, corona wires 84 and 87 are energized if the direction of air flow is to be downwardly in FIG. 7, whereas only corona wires 86 and 88 are energized for upward air flow through the duct 82 in FIG. 7. The spacing between the lengths of belt 94 and the respective corona wires is illustrated in the drawing.

An additional important feature of the embodiment of FIG. 7 resides in the fact that collector belt 94 is continuous and extends externally of duct 82 where it may be cleaned externally of the duct, such as by a dirt removal brush 98 which engages the screen to brush off any collected particles on the screen at 100. Belt 94 is passed over four rollers 102, 104, 106, and 108 mounted on uprights 110, in turn supported by brackets 112 and 114 extending outwardly from opposite sidewalls of the duct. Roller 108 is preferably provided with gears 116 and 118 at each end adapted to engage the meshes of belt 94 to drive it when the crank 120 connected to roller 108 is manually rotated. Belt 94 is preferably grounded through one or more of the rollers and uprights 110 and a suitable high voltage connection (not shown) is made to suitable pairs of the corona wires 84, 86, 87, and 88. It is apparent that instead of a brush 98, the belt 94 may be cleaned by passing it through a suitable solution, through a blower, or through other cleaning apparatus as desired. In addition, belt 94 may be automatically driven either continuously or intermittently, depending upon the amount of air or gas impurities collected on it by electrostatic precipitation.

Figure 8:
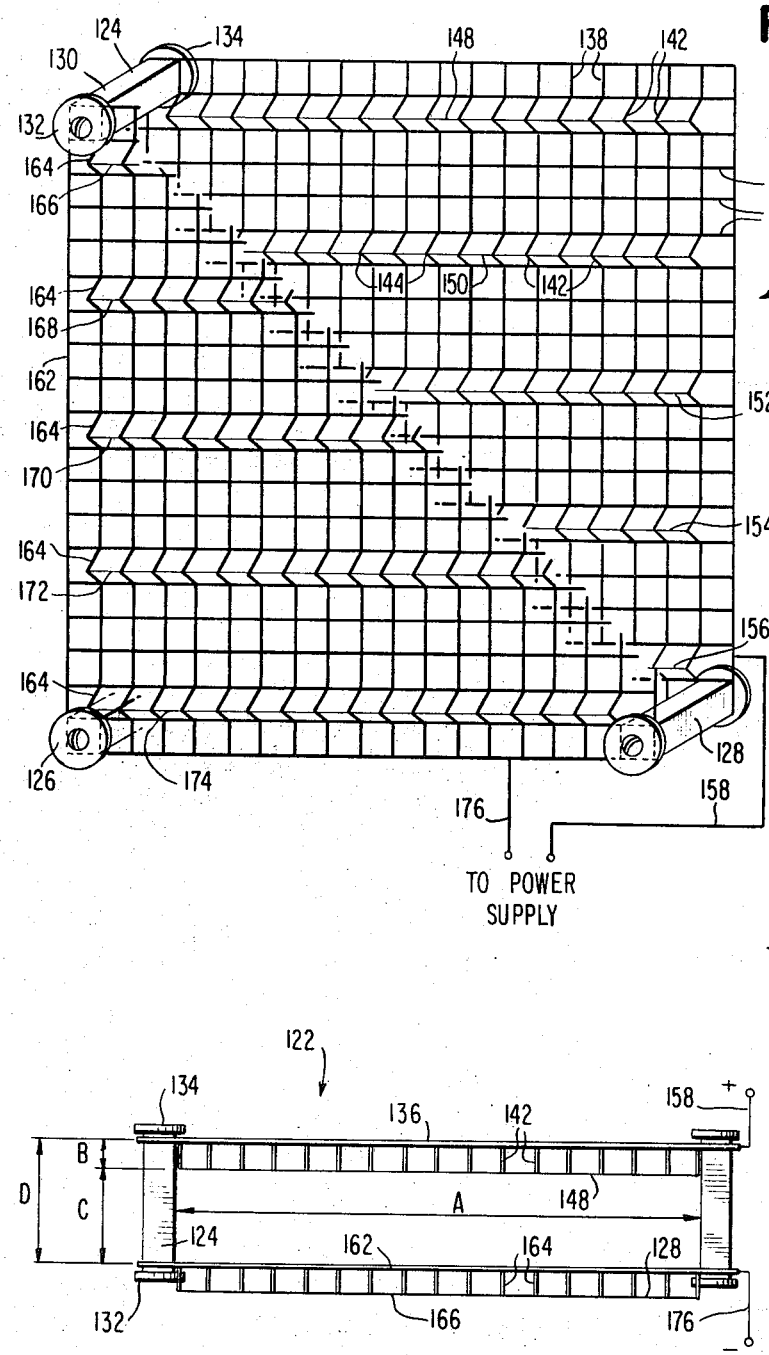
FIG. 8 shows a modified wind machine electrode construction in which the collector screen and corona wires are connected together to the same side of the power supply.
Figure 9:
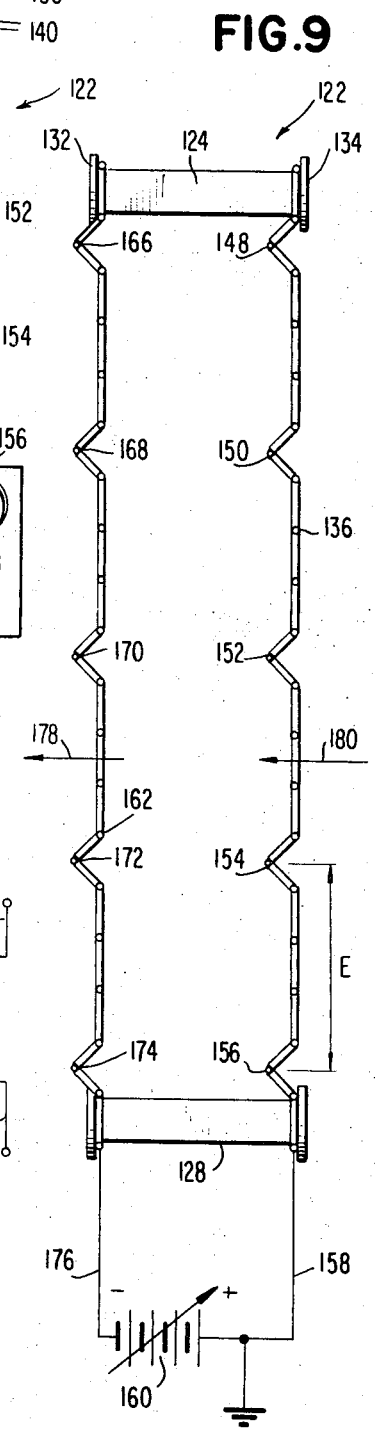
FIG. 9 is a side view of the modified electrode construction of FIG. 8.
Figure 10:
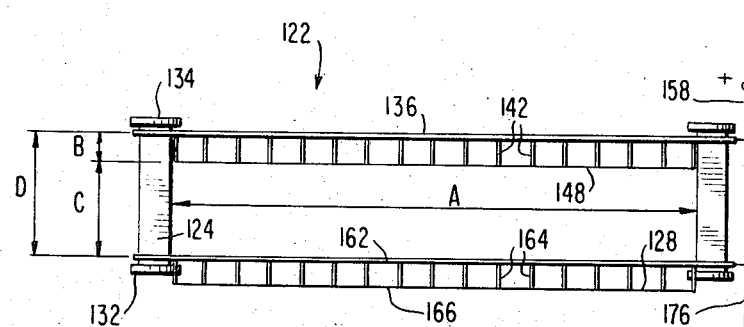
FIG. 10 is a plan view of the modified electrode construction of FIGS. 8 and 9 showing the electrode spacing.

FIG. 8 shows a modified grid wire assembly, generally indicated at 122, in which the corona wire and the collector screen are physically connected together and of the same polarity. FIG. 9 is a side view and FIG. 10 is a plan view of the grid wire assembly 122 of FIG. 8. The assembly comprises three electrical insulators 124, 126, and 128, all of identical construction and each comprising a central shank 120, preferably of rectangular or square cross section, joined by screws to circular end caps 132 and 134 having a larger diameter than either cross sectional dimension of shank 130.

Connected to one end of shank 130 near end cap 134 is a first collector screen or mesh 136 of generally planar construction comprising vertical wire strands 138 and horizontal crossing strands 140. Between every fourth pair of horizontal strands 140, the vertical strands 138 are bent outwardly of the plane of mesh 136 in substantially V-shape, as at 142, so that the point or tip of the V 144 of each bent out portion is horizontally aligned and parallel with the plane of the mesh but extends outwardly of the plane about one-fourth inch. Attached to the points by soldering or the like are a plurality of horizontally extending corona wires 148, 150, 152, 154, and 156. These corona wires are both physically and electrically connected to the mesh 136 which is in turn connected to one side of the power supply by lead 158 in FIG. 8. The power supply is illustrated by the variable D.C. source 160 in FIG. 9. Electrical connection to each of the corona wires 148, 150, 152, 154 and 156 is through the electrically conductive wire mesh 136.

Spaced a few inches from screen 136 is a second identical screen 162 having similar bent out portions 164, in all respects identical to the previously described bent out sections 142 of wire screen 136. Bent out portions 164 are similarly physically and electrically connected by soldering or the like to horizontally extending corona wires 166, 168, 170, 172 and 174, which are supported in parallel relationship about one-fourth inch outwardly of the plane of screen 162. Screen 162 is connected to the other side of the power supply 160 by a lead 176 in FIG. 8. With the assembly as physically constructed in FIGS. 8–10 connected to a power supply having the polarity shown in FIG. 9, the direction of air flow is that of the arrows 178 and 180 in FIG. 9. As before, the direction of air flow is independent of polarity but depends on the geometry of the system with the corona wires 148, 150, 152, 154 and 156 acting as ion sources and in this case the collector is formed by mesh 162. An important feature of the assembly illustrated in FIGS. 8–10 is that it provides a unitary and rigid construction which may be readily inserted into and removed from an air or other fluid conduit and is particularly adapted to multistaging. That is, while only two connected screens and corona wires are illustrated in the embodiment, it is understood that several sets may be provided or several of the assemblies 122 may be inserted in side-by-side relation with in each case the upstream horizontal corona wires acting as ion sources for the next adjacent wire screen connected to the other side of the power supply.

As with the previous embodiment, the most critical feature of the construction in the assembly of FIGS. 8–10 is the diameter of the corona wires. These wires should be sufficiently small to produce the corona effect and, as in the previous embodiment, the maximum permissible diameter for the corona wires has been found to be about 0.020 inch, with a diameter of 0.010 inch or smaller preferred. Since the corona wires are physically supported by the wire mesh screens 136 and 162 in this embodiment, the wire size is not limited by a physical support function and the corona wires may be made even smaller to further increase the wind generation.

For the grid wire assembly 122 and referring to FIG. 10, the dimension A shown in that drawing represents the effective horizontal span of a single corona wire. This dimension can be any length depending upon the cross section of air it is desired to move. The dimension B illustrated in the drawing is the distance from centerline to centerline of the wire mesh and the parallel corona wires and is the same for each set in the assembly. Dimension C is the distance between centerlines of successive corona wires and meshes for opposite polarity and the distance D is the centerline distance from a first mesh to a second mesh of opposite polarity. Dimension E, shown in FIG. 9, is the vertical distance between corona wires attached to the same mesh. While the relationships are not critical, it has been found that optimum wind generation is obtained if the dimension E is about twice the dimension C and if the dimension D is about 1.4 times dimension C. Dimension B is, of course, the distance D minus the distance C, which is determined by the relationships previously stated.

It is apparent from the above that the present invention provides an improved wind generating machine and, in particular, one which is adapted for use in conjunction with electrical precipitation, either as a part of the device or separately, one that is substantially independent of cross sectional area so that very large quantities of fluid may be moved, and, finally, a wind generating machine which exhibits substantially linear voltage sensitivity over a relatively wide range so that the rate of air flow may be simply and easily controlled by varying the potential applied between the corona wire or wires and the cooperating collector mesh. Important features of the present invention include the provision of an ion generator or ion source in the form of a corona wire of extremely small diameter and lying in a plane perpendicular to the direction of air flow through the device. Spaced from the corona wire or wires is a collector in the form of a wire mesh, also preferably lying in a plane perpendicular to the air flow. Since the ion generator or ion source is in the form of an elongated wire, it may be extended over substantially the entire cross sectional area through which it is desired to move the air, thus making it possible to construct wind machines of almost unlimited cross sectional area at a minimum of expense and with maximum efficiency.

While the operation of the wind machine is not completely understood, it is believed that small diameter circular cross sectioned wire has a sufficiently small radius of curvature so that a corona discharge occurs along the length of the corona wire to generate ions which are propelled by the electrical field toward the collector grid. This is believed born out by the fact that corona wires with other cross sectional shapes, including a sharp edge facing or pointed at the ground plane or collector mesh, work equally as well or even better. These other shapes include a wire with a tear-drop shaped cross section, a wire having a wedge shaped or tapered cross section tapering in a direction toward the collector mesh, and even a flat ribbon having a rectangular cross section with its longer cross sectional dimension perpendicular to the plane of the collector. In one embodiment, the corona wire took the form of a flat ribbon 0.002 inch thick and 0.25 inch wide.

By observing operation in a darkened room, violet corona discharges have been observed as in the form of sheaths around the corona wires. Because of what appears to be the generation of a relatively large amount of violet and ultraviolet light, the wind machine is believed useful as an insect killer since it is known that the ultraviolet spectrum is a considerable attractant to certain flies, moths, mosquitoes, etc. The wind effect, of course, helps to propel the insects into the area of the electric field. In any event, a substantial amount of wind is generated when the applied potential between the corona wires and collector mesh or grid is in the neighborhood of 7,000 to 20,000 volts or higher. The rate of flow appears to be substantially linear with applied voltage over this range and is significantly increased by adding successive stages. In addition to wind generation, the configuration of the wind machine of the present invention is such as to produce a substantial amount of electrostatic precipitation so that a substantial deposit of impurities on the collector meshes or screens occurs. While particularly described in its application to air ducts and other air flow equipment, it is apparent that the device of this invention may be used with other fluids and gases, particularly with exhaust gases and in chimneys, and is particularly advantageous where it is desirable to propel air at modest speeds through large cross sectional areas. It is particularly advantageous for use in conjunction with standard Cotrell effect precipitators where it is desirable to restore flow losses which occur as the air or other gas flows through the separate precipitating equipment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A wind machine comprising an air duct, an electrically conductive mesh extending across said duct and forming a reference potential plane transverse to the longitudinal axis of said duct, a corona wire spaced from said mesh and lying wholly in a second plane transverse to said longitudinal axis, said corona wire extending over an area in said duct substantially coextensive with the area of said mesh in said duct, means external of said duct for establishing electrical connection to said corona wire and said mesh, said mesh being formed by a continuous belt of flexible screen material, a portion of said belt extending externally of said duct, and means external of said duct for cleaning said belt.

2. A wind machine according to claim 1 wherein said cleaning means comprises a brush engaging said belt.

3. A wind machine according to claim 1 wherein said belt is mounted on rollers whereby it may be continuously moved through said duct.

* * * * *